United States Patent [19]

Dam

[11] Patent Number: 4,630,245

[45] Date of Patent: Dec. 16, 1986

[54] NON-CONTACTING LIQUID LEVEL DETECTION SYSTEM

[75] Inventor: Naim Dam, Oakland Gardens, N.Y.

[73] Assignee: Introtek Corporation, Deer Park, N.Y.

[21] Appl. No.: 514,242

[22] Filed: Jul. 15, 1983

[51] Int. Cl.⁴ .................. G01F 23/28; G08B 21/00
[52] U.S. Cl. ........................... 367/93; 310/340;
310/348; 310/354; 340/621
[58] Field of Search ................ 340/621; 367/93;
310/340, 354, 348; 24/274 WB, 274 P, 274 R,
19; 174/58

[56] References Cited

U.S. PATENT DOCUMENTS 3,167,668  1/1965  Nesh ........................... 310/340
4,144,517  3/1979  Baumoel ....................... 367/93
4,316,183  2/1982  Palmer et al. ................. 340/621

Primary Examiner—Glen R. Swann, III
Attorney, Agent, or Firm—Darby & Darby

[57] ABSTRACT

A transmitting transducer is mounted on the outside wall of a vessel and supplies bursts of ultrasonic energy. If liquid is present, the energy is coupled to the other side of the vessel. Otherwise, the energy is attenuated. A receiving transducer (which may be the same as the transmitting transducer) is positioned to receive the ultrasonic energy if liquid is present. It is gated to be active only when such energy should arrive in the presence of liquid. The receiving transducer therefore generates an electrical signal indicating presence or absence of liquid in the vessel at the level at which the transducers are mounted.

20 Claims, 4 Drawing Figures

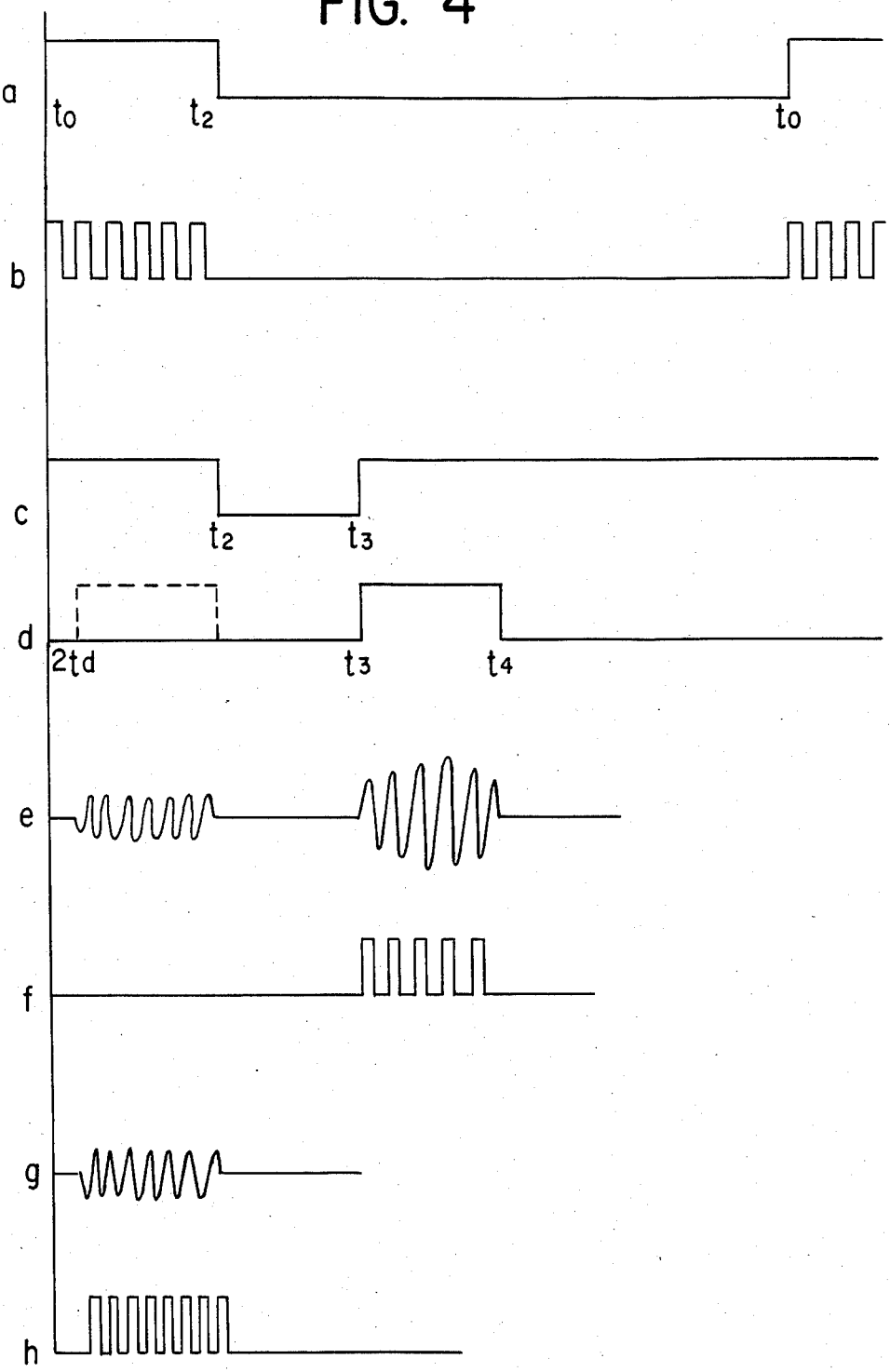

NON-CONTACTING LIQUID LEVEL DETECTION SYSTEM

BACKGROUND

Many situations exist where it is desirable to determine whether a pipe, container or vessel is filled with liquid to a predetermined point. This is often done by gauges, float switches or ultrasonic liquid level switches which must penetrate the pipe or vessel to make contact with the liquid. These devices are then used to produce an indication of a liquid level which then may be used to effect some control function such as starting or stopping liquid flow, filling or emptying a tank, etc.

The need for the sensing device to contact the liquid has several disadvantages. For example, there is a need to mount the device in contact with the liquid such as, for example, drilling a hole, making special seals, to bring out gage components, etc.

In U.S. Pat. No. 4,144,517 a liquid level detector is described which utilizes ultrasonic energy by detecting the damping effect on one or more reflections of a longitudinal wave of ultrasonic energy in the wall of a vessel or pipe caused by the presence of a liquid in the interior of the pipe or vessel at the location where the ultrasonic energy was injected. That is, the device of that patent operates to detect the presence of a liquid at a predetermined height in the pipe or vessel by detecting whether or not an interface between the pipe or vessel and the liquid is present. Such a device has several disadvantages in effecting measurements. For example, different wall materials and wall thicknesses have different characteristic impedances and multiple reflections can occur in some instances. Further, the response of such a system can be variable depending upon the wall material. For example, in a pipe or vessel which is of plastic material, practically no reflection occurs and this renders the detection method inoperable. Also, a film of grease or oil on the inner wall of the pipe or vessel dampens the rate of the decay of the multiple reflection. This gives a false indication of a liquid level.

THE PRESENT INVENTION

The present invention overcomes many of the disadvantages of the prior art by providing a novel ultrasonic liquid level detection system which determines the liquid level without having the sensor penetrate the wall of the pipe or vessel in which the liquid is being detected. In accordance with the invention, at least one sensor is mounted on the outer surface of the wall of the pipe or vessel. Electronic circuitry is provided to produce a burst of ultrasonic energy which is transmitted through the wall. If there is no liquid present at the point of entry of the ultrasonic energy, then the energy decays in the air, or other highly absorbent medium, in the pipe or vessel. If a liquid is present, then the energy is transmitted to the opposite wall of the pipe or vessel from which it is reflected back to and through the original wall through which it was originally transmitted and thereby to the sensor. Alternatively, a second sensor can be mounted opposite the first sensor and the energy transmitted through the opposite wall to the second sensor. The electronic circuitry is gated on for reception purposes at a time when a valid signal would be returned in the presence of liquid. In addition, reflection of the energy from the pipe wall can be used as a self-test signal.

It is therefore an object of the present invention to provide an ultrasonic liquid level detection system which uses a sensor which does not come into contact with the liquid.

A further object is to provide a non-contacting ultrasonic liquid level sensing system in which energy is transmitted through the pipe or vessel wall and returned to a sensor in the presence of a liquid or dissipated when there is no liquid.

Another object is to provide an ultrasonic liquid level sensing system which has a self-test circuit to check the operation of the sensor components.

Other objects and advantages of the present invention will become more apparent upon reference to the following specification and annexed drawing in which:

BRIEF DESCRIPTION OF THE DRAWINGS

FIG. 4 shows various timing diagrams of the signals at various points of the circuit.

DESCRIPTION OF THE PREFERRED EMBODIMENT

Figure 1:
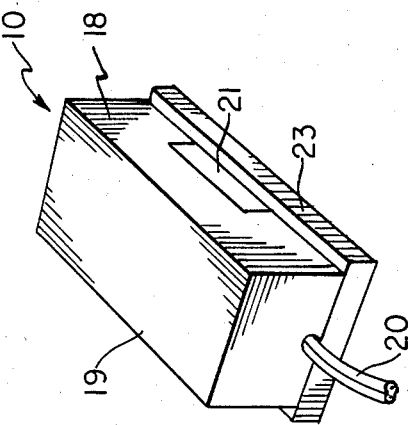
FIG. 1 is a longitudinal view taken in section showing a single sensor mounted on the wall of a pipe or vessel and also illustrating details of the sensor construction.

FIG. 1 shows a transducer, or sensor, 10 which is mounted on the wall of a pipe, tank or vessel 12, hereafter called a vessel. The vessel has a wall 14 of a given thickness d and an internal diameter D. The wall thickness d is of not great consequence since the system of the invention works with wall thicknesses up to about ½ inch thick and sometimes even greater, for various types of materials, e.g. steel. In addition, the internal diameter D of the vessel is of no great consequence since the system has successfully operated on containers as large as 55 gallon oil drums.

Generally, it can be said that the limiting factor for the invention is a combination of the following factors:

(1) the output power of the ultrasonic pulses;
(2) the thickness d of the wall of the vessel;
(3) the material of the wall, with plastics and composites absorbing more energy;
(4) the diameter D of the pipe or vessel; and
(5) the particular type of medium within the pipe or vessel, this being important since sonic energy is transmitted or dissipated to greater or lesser degrees depending upon the type of liquid through which the energy is transmitted. For example, a highly aerated liquid, that is one containing bubbles, will not be as good a transmissive medium as an uncompressible medium, e.g. water or oil. Further, a highly viscous medium is usually not as good a transmitter as a less viscous medium.

The container 12 may be of any shape, e.g. square, rectangular, cylindrical, etc. In general, in systems using only a single transducer such as shown in FIG. 1, the main criteria is that the energy can be reflected from a wall opposite the transducer, i.e. from the other side of the pipe or vessel, and returned to the original point of transmission. In a two transducer system, described below, is only necessary that the energy from one transducer be beamed across the vessel and through the portion where the liquid is to be present to the other transducer.

Additionally, with respect to a single transducer system, it should be understood that if there is an internal pipe or other object located within the vessel, e.g. a central rod, energy also can be reflected from that central rod back toward the transducer.

Figure 2:
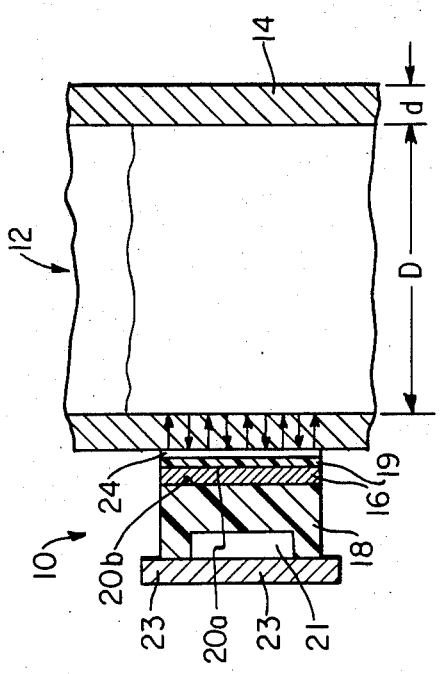
FIG. 2 is a perspective view showing details of the sensor.

The details of the transducer 10 are shown in FIGS. 1 and 2. The transducer body 18 is made from epoxy or PVC material preferably by molding. Epoxy is preferred since it can be molded very easily into a desired shape. The transducer 10 is shown as being generally rectangular in shape in the preferred embodiment although any other shape can be used, e.g. square, circular, etc. The transducer has therein a wafer of piezoelectric material 16, i.e. material which converts electrical energy into mechanical (ultrasonic) energy and vice versa. Suitable materials are PZT and barium titanate as is well known in the art. The piezoelectric wafer 16 is embedded in the body 18 by the body material and there is a thin front window 19 of the body material in front of the piezoelectric material. A pair of leads 20a, 20b are attached to electrodes, e.g. a film of metal (not shown) on the front and rear faces of the piezoelectric wafer. The leads are preferably the two conductors of a coaxial cable which extends to the electronic circuitry to be described with respect to FIG. 3. A slot 21 is molded in the body so that a clamping strap can be inserted therethrough, for example, the type of a clamp which is ordinarily used with automobile hoses or similar. The body includes a back plate member 23 and the strap is placed between the body 18 and the plate 23 and presses against the body 18.

In mounting the transducer 10 on the wall of the vessel 12 usually some coupling compound 24 is placed between the front window 19 and the vessel wall. This can be, for example, silicone grease, as is conventional in the art, or petroleum jelly. It should be understood that the strap extending through the slot 21 permits the transducer to be moved up and down along and around the vessel. This makes the transducer easy to mount and available to sense liquid at any point since the sensing point can be easily changed. If desired, permanent mounting of the transducer can be made by any suitable adhesive, such as epoxy.

Figure 3:
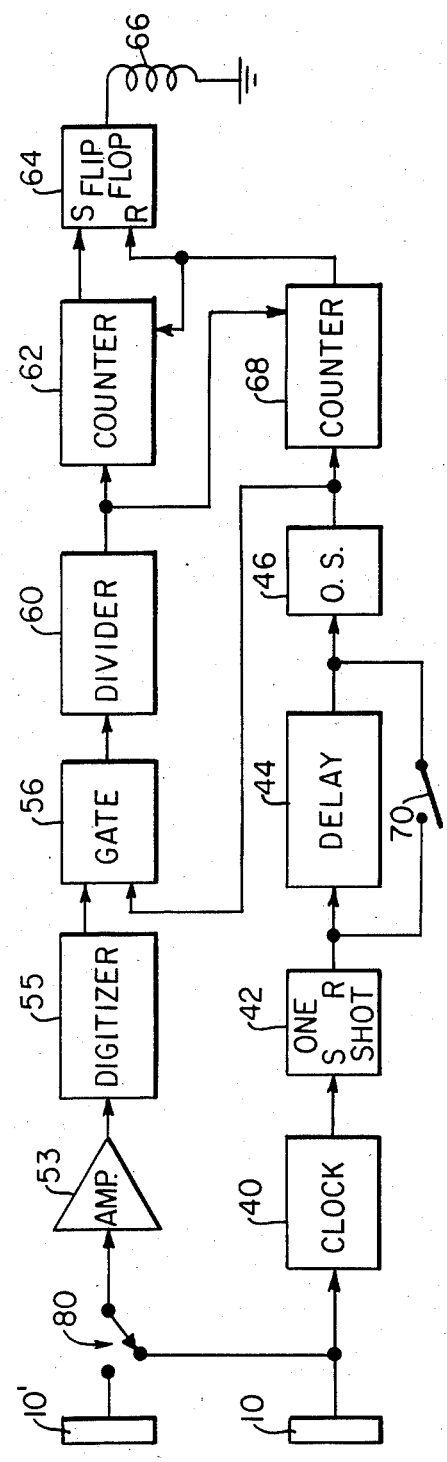
FIG. 3 is a schematic diagram of the circuitry of the system.

Referring to FIG. 3, the circuitry of the system includes a clock pulse generator 40 which produces bursts of ultrasonic energy in the form of rectangular clock pulses at a desired frequency. Typical frequencies which have been found to work successfully are in the range of from about 3 Mhz to about 5 Mhz. While these frequencies may also be considered to be in the low radio frequency range, they are also considered to be ultrasonic in the sense that they are of higher frequency than sound waves and it is the mechanical properties of the energy which is relied upon rather than the electromagnetic properties. The wafer 16 of piezoelectric material is cut to be resonant at or near the frequency of the pulses from the pulse generator 40.

As indicated previously, the ultrasonic energy is damped if there is no liquid in the interior of the vessel 12 and it is transmitted through to the other wall of the vessel if there is a liquid present. Assuming that there is no liquid within the vessel, the energy will be reflected from the inner face of the wall at the interior of the vessel back to the transducer as shown in the left-hand sectioned wall of FIG. 1. The time t for this to occur is equal to:

$$t = 2d/V_w,$$

where:

$d$ = the thickness of the vessel wall, and $V_w$ = the velocity of the propogation of the ultrasonic energy in the wall.

When liquid is present in the vessel, the ultrasonic energy will be transmitted through the wall, then into and through the liquid across the vessel diameter D to the opposite wall from which it is reflected back through the liquid toward the originating point and through the wall back to the transducer. In the presence of the liquid the energy is received from the opposite side of the container wall in a round trip time $T = 2(D/V_L + d/V_w)$, where:

$V_L$ is the velocity of the energy in the liquid medium; and $D$ = the distance across the vessel.

Upon receipt of the reflected energy, the transducer 10 converts it into an analog electrical signal at the original frequency which can be amplified.

Referring again to FIG. 3, the clock pulse generator 40 is gated on for a predetermined time period by a monostable, self-triggering, one-shot multivibrator circuit 42 which produces a transmit window. The on time period for the clock pulse generator is from $t_0$ to $t_2$ as shown on line a of FIG. 4 during which the clock pulses are provided to the transducer 10 for transmission through the vessel wall. The clock pulses are shown on line b. It should be understood that many more pulses than those shown are produced during this period. The one-shot multivibrator 42 is set to have an off period, as shown on line a of FIG. 4 from $t_2$ back to $t_0$ of the next cycle during which no clock pulses are supplied to the transducer, but instead, the transducer is available to listen for received energy from either the wall of the vessel through which it is being transmitted or the reflected energy from the opposite wall when there is a liquid present. Also, durng this off period, processing of the received signals is taking place.

At the end of the transmit window, when the one-shot 42 changes state, the signal from its output is applied to the input of a triggered delay multivibrator 44. The delay multivibrator 44 produces a predetermined delay inhibit period from $t_2$ to $t_3$ (see line C of FIG. 4). The inhibit period $t_3-t_2$ corresponds to the time when pipe noise would normally be heard. This inhibit period can be eliminated to perform the self test, as described below.

The output of the delay flip-flop, when it changes state, turns on a one-shot 46 at $t_3$ to produce a receive window enable signal on line 47 from $t_3$ to $t_4$ (see line d of FIG. 4). That is, when one shot 46 is in the first state a disable (no receive) signal is produced on its output line 47 and when in a second state an enable receive signal is produced on the same output line 47.

During the receive window period $t_3$ to $t_4$, any reflected signals received from the opposite wall by transducer 10 are converted from acoustic energy into an analog RF signal are applied to the input of an amplifier 53 which can be any conventional analog amplifier. Line e of FIG. 4 shows the received signal which occurs during the receive window period $t_3$ to $t_4$. This is of higher amplitude than the signal which is reflected back to the transducer from the vessel wall during the time starting from $2t_d$ to some later time which is equal to or somewhat less than the duration of the burst of clock pulses.

The output of the amplifier 53 is applied to a digitizer 55. This is a conventional circuit which has a threshold detector and a pulse shaping, or squaring, circuit. The threshold detector is set above the level of noise in the system so that noise will not trigger the system. A squaring circuit squares received signal into pulses which can be counted. The output of the digitizer is applied to a gate, or AND type, circuit 56 whose other input is from line 47 so that the gate is opened during the receive window period $t_3$ to $t_4$.

The receive window 60 from time $t_3$ to $t_4$ can be of any suitable selected duration. Preferably, it is made somewhat less than the transmit window time $t_0$ to $t_2$. It is also made to begin at a time $t_3$ which is sufficiently great to accommodate of energy transmit times for a variety of vessel diameters D.

The circuit performs signal processing to discriminate against false alarms, i.e. providing a signal when liquid is present when it is not. This is done by a signal averaging technique which produces an output signal indicating the presence of a liquid only after the reflection of engergy back to the transducer has been confirmed for a predetermined number of times. As noted previously, if there is no liquid in the vessel, then during the receive window time, the amplitude of the signal received at the transducer will not be sufficient to exceed the threshold level of the digitizer 55. Therefore, there will be no pulses produced at the digitizer output. This is shown on line g of FIG. 4.

Assuming that there is liquid in the vessel and a signal is received by the transducer and converted to pulses during the receive window time, these pulses are provided to a divider-counter 60. The divider-counter produces an output pulse for a predetermined arbitrary number of input pulses from the digitizer. The division ratio is selected as a function of the frequency of the transient signal and the time duration of signal averaging desired. For example, the divider-counter 60 can be structured to produce one output pulse for every four input pulses.

The output of divider-counter 60 is applied to an overflow counter 62. This counter is set to produce an output signal after receiving a predetermined number of pulses at its input from divider-dounter 62. This output signal will be retained for all subsequent input signals until the counter is reset to zero. For example, the overflow count can be that which is equal to the pulses received from the divider-counter 60 after there has been a large number, say 100, of bursts of energy transmitted into the vessel. Thus, it takes 100 confirmations of the liquid being present before the overflow counter 62 produces an output signal.

The output signal from counter 62 is applied to the set input of a flip-flop 64. When the flip-flop is set, it produces an output signal which is used to energize some type of an indicator, such as a relay 66. If necessary, power amplifiers can be located between the flip-flop output and the relay. When the relay is energized, it has been determined with a reasonable degree of certainty that liquid is present in the vessel. Relay 66 can be used to perform any desired control.

The relay is deenergized, if once energized and then the liquid is removed from the vessel to a point below the transducer, or is kept deenergized in the absence of a liquid in the vessel, by a control counter 68, which is also of the overflow type. Counter 68 increments its count by one each time there is a burst of transmitted energy, in respone to the triggering of the multivibrator 46 which sets the receive window. The control counter 68 has a reset input which is connected to the output of counter-divider 60. The output of control counter 68 is applied to the reset input of the flip-flop 64. If a return signal is being received by the transducer 10, indicating that there is liquid in the vessel, then counter 68 is reset each time divider-counter 60 produces an output signal and the control counter produces no output signal. Thus, the state of the flip-flop 64 is left set and the relay 66 is kept energized.

If there is no liquid, or the liquid has dropped below the transducer level, then the counter-divider 60 will not produce a reset signal for control counter 68. The count of control counter 68 will now be incremented by one each time there is a burst of energy transmitted and the counter will increment until its overflow level is reached at which time it will produce an output signal which will reset the flip-flop 64 and deenergize relay 66. At the same time, its output signal is used to reset counter 62 so that it can start to increment from a zero level once the digitizer 55 produces output pulses in response to the occurrence of a liquid. The overflow count of counter 68 can be any suitable number.

It should be noted that if the vessel was originally dry the digitizer 55 produces no output pulses, counter 62 does not overflow and the flip-flop 64 is never set. In this case, control counter 68 is not reset and is kept in the overflow state by the signal from multivibrator 46 at each transmit cycle. This keeps flip-flop 64 reset and relay 66 deenergized.

If a dry vessel is filled with liquid to the level of the transducer, then the digitizer 55 produces pulses which reset control counter 68 and keep it from incrementing. The flip-flop 64 will temporarily stay in the reset condition, but after a time the counter 62 will be overflowed so that it produces a signal to set the flip-flop 64 and thereby energize the relay.

The circuit has a self test capability which can be used to check the system. This is provided by disabling the delay multivibrator 44 as shown illustratively by bypassing it when switch 70 is closed. When this is done, the receive window is moved toward $t_0$ to occur at about the time $2t_d$ when the reflected signal from the vessel wall is received (see lines d, g and h of FIG. 4). However, now the reflected signals from the vessel wall are digitized and divided by counter divider 62 which produces output pulses to increment counter 62 and energize relay 66. This provides a self test of all of the electronic circuitry and the transducer. If the relay is not energized during the self test, then there is a defect in either the transducer or the electronic circuitry.

Even if a liquid is present in the vessel during self test, no reflected signals are processed since these signals cannot be passed from the digitizer to the signal processing circuitry since the receive window occurs earlier.

If the vessel is dry, then there are no reflected signals to be processed.

In some instances, e.g. a thick walled vessel, highly areated or highly viscous liquid, or large diameter vessels, the gain of the system must be increased in order to provide accurate operation. This can be accomplished in a variety of ways. For example, the power supplied to the transducer can be increased. Sometimes, this is not feasible. Another alternative, as shown in FIG. 3, is to use a second transducer so that transducer 10 acts as a transmitter and transducer 10' as a receiver. This can be accomplished by mounting the transducers in line with each other across the vessel so that the signals transmitted by the first transducer, transducer 10 is received by a second transducer 10'.

The circuit of FIG. 3 can be used for the two tranducer arrangement by the addition of a switch 80, although the circuit can be hardwired for two transducers. Here the transducer 10' directly feeds the analog amplifier 53. In this case, the delay period $t_2-t_3$ can be made less since only one-way travel of the energy is needed. In all other respects the system operates the same as previously described. The gain of the system is increased since the signal has to travel only one way through the liquid.

I claim:

1. A non-contacting liquid sensing system comprising:
    transducer means for mounting on the exterior of the wall of a vessel containing a liquid,
    means for supplying a burst of electrical energy to said transducer means to cause it to vibrate to produce a burst of sonic energy which is transmitted through the wall of said vessel upon which said transducer is mounted into its interior for transmission across the interior of said vessel to an opposing surface in the presence of a liquid at the location on the vessel interior across which the sonic energy is being transmitted and being attenuated in the absence of a liquid, and
    transducer means mounted on the exterior of the wall of the vessel for receiving sonic energy incident upon said opposing surface and passing through said wall and for converting said received sonic energy into electrical signal.

2. A non-contacting liquid level sensing system as in claim 1 further comprising circuit means coupled to said transducer means for receiving the sonic energy incident upon said opposing surface and passing through said wall for utilizing said electrical signal starting at a predetermined time after the burst of sonic energy is first transmitted through said wall.

3. A liquid level sensing system as in claim 1 wherein said transducer means for transmitting the sonic energy and for receiving the sonic energy are the same transducer means.

4. A liquid level sensing system as in claim 2 wherein said transducer means for transmitting the sonic energy and for receiving the sonic energy are the same transducer means.

5. A liquid level sensing system as in claim 1 wherein said transducer means for transmitting the sonic energy and for receiving the sonic energy are separate, said two transducer means being mounted on the exterior of the wall of the vessel so that one can receive the energy transmitted by the other across the interior of the vessel.

6. A liquid level sensing system as in claim 2 wherein said transducer means for transmitting the sonic energy and for receiving the sonic energy are separate, said two transducer means being mounted on the exterior of the wall of the vessel so that one can receive the energy transmitted by the other across the interior of the vessel.

7. A non-contacting liquid level sensing system as claim 2 wherein said circuit means further comprises means for producing second signals in response to said electrical signal after each said predetermined time occuring after a said burst of electrical energy, and means responsive to a predetermined number of second signals to produce an output control signal indicative of the presence of a liquid in the vessel interior at the location across which the sonic energy is being transmitted.

8. A non-contacting liquid level sensing system as in claim 7 wherein said means for producing said output control signal further comprises a counter means which is incremented in response to said second signals.

9. A non-contacting liquid level sensing system as in claim 7 further comprising means responsive to the absence of a said electrical signal after said predetermined time to produce a third signal which is indicative of the absence of liquid in the vessel at the location in the vessel interior across which the sonic energy is being transmitted.

10. A non-contacting liquid level sensing system as in claim 8 further comprising means responsive to the absence of a said electrical signal after said predetermined time to produce a third signal which is indicative of the absence of liquid in the vessel at the location in the vessel interior across which the sonic energy is being transmitted, and means for applying said third signal to said first counter means to reset it.

11. A non-contacting liquid level sensing system as in claim 9 wherein said means responsive to the absence of said electrical signal comprises a counter means, means coupled to said second counter means to increment its count in response to successive bursts of transmitted energy, said second counter means producing said third signal in response to being incremented to a predetermined count.

12. A non-contacting liquid level sensing system as in claim 10 wherein said means responsive to the absence of said electrical signal comprises second counter means, means coupled to said counter means to increment its count in response to successive bursts of transmitted energy, said counter means producing said third signal in response to being incremented to a predetermined count.

13. A non-contacting liquid level sensing system as in claim 9 further comprising means responsive to both said output control signal and to said third signal to produce an indication of the presence or absence of liquid in the vessel at the location in the vessel interior across which the sonic energy is being transmitted.

14. A non-contacting liquid level sensing system as in claim 11 further comprising means responsive to both said output control signal and to said third signal to produce an indication of the presence or absence of liquid in the vessel at the location in the vessel interior across which the sonic energy is being transmitted.

15. A non-contacting liquid level sensing system as in claim 1 further comprising means coupled to the transducer transmitting the energy for receiving the energy reflected from the inside of the wall at its point of entry at a predetermined time before the burst of energy is completely transmitted across the interior of the vessel for detecting that energy which has been reflected from the wall.

16. A non-contacting liquid level sensing system as in claim 15 wherein said detecting means produces an output signal after receiving signals reflected from the wall only after a predetermined number of bursts of electrical energy.

17. A non-contacting liquid level sensing system as in claim 1 wherein said transducer means comprises a block of an electrically insulating material, and a wafer of piezoelectric material embedded in said block close to a wall thereof.

18. A non-contacting liquid level sensing system as in claim 17 wherein said body includes an opening therein to accept a mounting strap to mount the transducer to the exterior of a wall of a vessel.

19. A transducer for a non-contacting liquid level sensing system comprising a block of an electrically insulating material and a wafer of piezoelectric material embedded in said block close to a wall thereof, said block having an opening therein to accept a mounting strap to mount the transducer to the exterior of a wall of a vessel.

20. An ultrasonic transducer for mounting on the exterior of a vessel comprising a block of an electrically insulating material, a wafer of piezoelectric material embedded in said block close to a wall thereof, said block being formed with a through passage in an area remote from said wafer to permit the passage of a strap means therethrough for mounting said transducer to the wall of said vessel.

* * * * *